US010990318B2

(12) United States Patent
Parker (10) Patent No.: US 10,990,318 B2
(45) Date of Patent: Apr. 27, 2021

(54) METHOD AND SYSTEM FOR RECEIVING A DATA FILE

(71) Applicant: PacByte Solutions Pty Ltd, North Epping (AU)

(72) Inventor: Bruce Parker, Mt. Colah (AU)

(73) Assignee: PacByte Solutions Pty Ltd, North Epping (AU)

( * ) Notice: Subject to any disclaimer, the term of this patent is extended or adjusted under 35 U.S.C. 154(b) by 0 days.

(21) Appl. No.: 16/338,448

(22) PCT Filed: Sep. 29, 2016

(86) PCT No.: PCT/IB2016/055813
§ 371 (c)(1),
(2) Date: Mar. 29, 2019

(87) PCT Pub. No.: WO2017/056027
PCT Pub. Date: Apr. 6, 2017

(65) Prior Publication Data
US 2020/0012449 A1    Jan. 9, 2020

(30) Foreign Application Priority Data
Oct. 1, 2015  (AU) ............................... 2015904001

(51) Int. Cl.
*G06F 12/00*        (2006.01)
*G06F 3/06*         (2006.01)
(Continued)

(52) U.S. Cl.
CPC ............ *G06F 3/0656* (2013.01); *G06F 3/064* (2013.01); *G06F 3/0688* (2013.01);
(Continued)

(58) Field of Classification Search
CPC combination set(s) only.
See application file for complete search history.

(56) References Cited

U.S. PATENT DOCUMENTS 5,136,582 A     8/1992   Firoozmand
6,301,604 B1 *  10/2001  Nojima .............. H04N 7/17336
                                            348/E5.008
(Continued)

FOREIGN PATENT DOCUMENTS

WO      2008026186        3/2008
WO   WO-2008026186 A2 *   3/2008   ......... H04N 21/2343

OTHER PUBLICATIONS

International Search Report and Written Opinion of the International Searching Authority dated Dec. 16, 2016, in International Patent Application No. PCT/IB2016/055813, 14 pages.
(Continued)

*Primary Examiner* — John A Lane
(74) *Attorney, Agent, or Firm* — Ellen M. Bierman; Lowe Graham Jones PLLC (57) ABSTRACT

A method of receiving data segments of a data file on a user electronic device from a remote data source or sources over a data network. The data file being requested by or being pushed to an intended recipient application program executing on the user electronic device. The method includes receiving incoming data segments from the remote device over the data network and maintaining a memory buffer in memory of the user electronic device comprising one or more memory blocks. A status indicator for each memory block in the memory buffer is maintained that is indicative of the status of the memory block and the incoming data segments are allocated to specific memory blocks for storage in the memory buffer based at least partly on their respective status indicator. The stored data segments from the memory buffer are then provided to the recipient application program on the user electronic device for use or playback for example.

20 Claims, 3 Drawing Sheets

(51) Int. Cl.
  *G06F 9/30* (2018.01)
  *G06F 9/455* (2018.01)
  *G06F 9/50* (2006.01)
  *G06F 12/02* (2006.01)
(52) U.S. Cl.
  CPC ...... *G06F 9/30123* (2013.01); *G06F 9/45558* (2013.01); *G06F 9/5016* (2013.01); *G06F 12/0238* (2013.01); *G06F 3/0607* (2013.01)

(56) References Cited

U.S. PATENT DOCUMENTS

| | | | |
|---|---|---|---|
| 7,243,354 B1 | 7/2007 | Chhabra et al. | |
| 8,327,011 B2* | 12/2012 | Price | H04L 29/06027 709/231 |
| 8,510,459 B2* | 8/2013 | Parker | H04L 69/04 709/231 |
| 2004/0093420 A1* | 5/2004 | Gamble | H04L 67/06 709/231 |
| 2005/0066063 A1* | 3/2005 | Grigorovitch | H04N 21/6125 710/1 |
| 2005/0286526 A1 | 12/2005 | Sood et al. | |
| 2006/0109856 A1* | 5/2006 | Deshpande | H04L 47/14 370/412 |
| 2008/0270744 A1 | 10/2008 | Hashimoto | |
| 2011/0019976 A1* | 1/2011 | Park | H04N 21/23439 386/294 |
| 2018/0173673 A1* | 6/2018 | Daglis | G06F 9/528 |

OTHER PUBLICATIONS

International Preliminary Report on Patentability dated Oct. 10, 2017, in International Patent Application No. PCT/IB2016/055813, 27 pages.

Kim, Hyeongyeop, "Understanding TCP/IP Network Stack & Writing Network Apps," CUBRID Blog, Open Source RDBMS, 2013, retrieved from the Internet on Aug. 15, 2016, at http://www.cubrid.org/blog/dev-platform/understanding-tcp-ip-network-stack/, 39 pages.

* cited by examiner

METHOD AND SYSTEM FOR RECEIVING A DATA FILE

CROSS-REFERENCE TO RELATED APPLICATION

This application is a U.S. national phase of International Patent Application No. PCT/IB2016/055813, filed Sep. 29, 2016, the contents of which application is incorporated herein by reference in its entirety.

FIELD OF THE INVENTION

The invention relates to the method and system of receiving data files on an electronic device over a data network. In particular, although not exclusively, the method and system relates to receiving streamed audio and/or video files.

BACKGROUND TO THE INVENTION

Electronic data files are transmitted over the internet or other data networks to be accessed, stored or streamed for video and/or audio playback by user electronic devices such as computers, tablets, smart phones, smart televisions and the like. The electronic data files are typically requested by application programs or software applications running on the user electronic devices, and the application programs are capable of playing back the video and/or audio data files received over the data network.

The data files are typically transmitted using network protocols including TCP/IP and FTP. Traditionally these data files are segmented into multiple data packets and transmitted from one device, such as a server, to a client or user electronic device where they are reassembled for storage and/or playback. The data files may be downloaded entirely prior to playback, or alternatively streamed for playback.

Typically, the reassembly of the received data packets occurs in memory (e.g. RAM) or cache of a client or user electronic device and is then transferred to an Input/Output (I/O) storage device, component or module of the electronic device for storage. This I/O storage component is then accessed by the application program on the client or user electronic device to access the data, for playback of streaming audio or video for example. I/O storage devices typically include, for example, Hard Disk Drives, Solid State Drives and flash memory. Individual application programs sometimes have areas on an I/O storage device that are treated as a cache by that application program.

In this specification where reference has been made to patent specifications, other external documents, or other sources of information, this is generally for the purpose of providing a context for discussing the features of the invention. Unless specifically stated otherwise, reference to such external documents is not to be construed as an admission that such documents, or such sources of information, in any jurisdiction, are prior art, or form part of the common general knowledge in the art.

SUMMARY OF THE INVENTION

It is an object of this invention to provide an improved method and system for receiving and/or accessing data files over the internet or other data network on an electronic device, or to at least provide the public with a useful choice.

In a first aspect, the invention broadly consists in a method of receiving data segments of a data file on a user electronic device from a remote data source or sources over a data network, the data file being requested by or being pushed to an intended recipient application program executing on the user electronic device, the method executed by a processor of the user electronic device, and comprising: receiving incoming data segments from the remote device over the data network; maintaining a memory buffer in memory of the user electronic device comprising one or more memory blocks; maintaining a status indicator for each memory block in the memory buffer that is indicative of the status of the memory block; allocating incoming data segments to specific memory blocks for storage in the memory buffer based at least partly on their respective status indicator; and providing the stored data segments from the memory buffer to the recipient application program on the user electronic device.

In an embodiment, the step of receiving incoming data segments may comprise receiving the data segments over a single thread.

In an embodiment, receiving incoming data segments may comprise receiving the data segments over a plurality or multiple threads.

In an embodiment, the plurality or multiple threads may execute or operate concurrently.

In an embodiment, the method may further comprise maintaining a plurality of memory buffers, one for each respective thread of incoming data segments.

In an embodiment, the data segments may be segmented from the original data file, each data segment having an associated position or ordinal value representing its position within the original data file relative to the other data segments.

In an embodiment, the data segments may be in the form of data packets.

In an embodiment, receiving incoming data segments may comprise receiving one or more data streams.

In an embodiment, the data network may be the internet.

In an embodiment, the remote data source may be a streaming data source.

In an embodiment, the data source(s) may be a data or network server or combination of data or network servers, a remote device or combination or remote devices in a peer-to-peer network, or a combination of data or network servers and remote devices in a peer-to-peer network.

In an embodiment, the remote data source may be a remote device operating in a peer-to-peer network or structure.

In an embodiment, maintaining the memory buffer in memory may comprise allocating or designating one or more portions of available memory of the user electronic device as memory blocks.

In an embodiment, maintaining the memory buffer in memory may comprise allocating or designating a contiguous portion of available memory of the user electronic device for the one or more memory blocks.

In an embodiment, maintaining the memory buffer in memory may comprise segmenting each memory block into a plurality of memory segments.

In an embodiment, segmenting each memory block into a plurality of memory segments may comprise segmenting the memory blocks into memory segments having a size that matches the incoming data segments.

In an embodiment, the method may comprise segmenting each memory block into memory segments of uniform size.

In an embodiment, the method may comprise segmenting the memory blocks into memory segments of variable or non-uniform size.

In an embodiment, maintaining the memory buffer may comprise maintaining a memory buffer that is fixed in size.

In an embodiment, maintaining the memory buffer may comprise maintaining a memory buffer that is fixed in size for the entire download session associated with a data file.

In an embodiment, the method may further comprise determining the size of the fixed memory buffer prior to commencing the download session of a data file.

In an embodiment, the method may comprise determining the size of the fixed memory buffer based at least partly on the size of the data segments and/or data file being downloaded.

In an embodiment, the method may further comprise stalling the receipt of further incoming data segments if the status indicator(s) of the memory buffer indicate there is no further available memory space in the memory buffer for storing the further incoming data segments.

In an embodiment, the method may further comprise re-initiating the receipt of further incoming data segments if the status indicator(s) of the memory buffer indicate there is available memory space in the memory buffer for storing further incoming data segments.

In an embodiment, maintaining the memory buffer may comprise maintaining a memory buffer that is variable in size.

In an embodiment, maintaining the memory buffer may comprise dynamically increasing or reducing the size of the memory buffer based on the current memory resource available and/or the memory resource required.

In an embodiment, the status indicator associated with each memory block may be indicative of or represent the usage status of the memory block.

In an embodiment, maintaining a status indicator for each memory block in the memory buffer may comprise maintaining a status indicator in the form of a state value selected from a predetermined number of different states.

In an embodiment, the state value may be in the form of any one or more of the following: a numerical value, a non-numerical value, or a combination of a numerical and non-numerical value.

In an embodiment, the state value may be in the form of an index value selected from an index table, each index value corresponding to a different memory block status.

In an embodiment, the index table may comprise two or more index values.

In an embodiment, the state values may each respectively correspond to one of the following states: memory block empty, memory block receiving data or currently full, memory block full, memory block read.

In an embodiment, maintaining a status indicator for each memory block may comprise updating the status indicator for each block periodically, continuously, or in response to a detected change in memory block status.

In an embodiment, the method may further comprise intercepting data file requests generated by the recipient application program, and forwarding those data requests to the remote data source.

In an embodiment, receiving incoming data segments from the remote device over the data network may comprise intercepting the data segments requested by the recipient application program.

In an embodiment, the method comprises implementing the interception of the data file requests and/or data segments is such that the recipient application program is agnostic to the interception.

In an embodiment, allocating incoming data segments to specific memory blocks in the memory buffer may comprise allocating incoming data segments to a memory block or blocks having a status indicator indicative of the memory block being empty or partially full.

In an embodiment, the method may comprise allocating incoming data segments to memory blocks having a status indicator indicative of the memory block being partially full, in preference to memory blocks having a status indicator indicative of the memory blocks being empty.

In an embodiment, providing the data segments from the memory buffer to the recipient application program may comprise reading-out to the application program, or enabling access by the application program to, the data segments in memory blocks having a status indicator indicative of the memory block being full.

In an embodiment, the method may further comprise clearing or emptying memory blocks having a status indicator indicative of the memory block having been read by the recipient application program so that the memory blocks of the memory buffer can be re-used for storing new incoming data segments of the data file.

In an embodiment, the memory buffer may comprise contiguous memory blocks and the method may comprise allocating incoming data segments to specific memory blocks of the memory buffer in a cyclical manner and based on their status indicator(s).

In an embodiment, providing the data segments from the memory buffer to the recipient application program may comprise re-assembling and/or providing the data segments from the memory buffer in the correct order to the recipient application program.

In an embodiment, the method may be implemented by a local server executing or operating on the user electronic device.

In an embodiment, the local server may be a software application program or a virtual machine.

In an embodiment, the data file may be an audio or video data file streamed from the data source.

In an embodiment, the data file may be an audio or video data file streamed from the data source, and the recipient application programs may be an audio or video playback application program, and the method may comprise reading-out to the application program, or enabling access by the application program to, the data segments in the memory buffer such that the application program can directly receive or access the data segments from the memory buffer for streamed playback for the audio or video data file.

In an embodiment, providing the data segments from the memory buffer to the recipient application program may be carried out without storing the data segments in any I/O storage component of the user electronic device.

In a second aspect, the invention broadly consists in a method of receiving data on a user electronic device from a data source or sources over a communication link or data network, the data being provided to an intended recipient application program operating on the user electronic device, the method executed by a processor of the user electronic device, and comprising: receiving incoming data from the data source or sources over the communication link or data network; maintaining a memory buffer in memory of the electronic device, the memory buffer comprising one or more memory blocks; allocating the incoming data to one or more memory blocks of the memory buffer based at least partly on the status of the memory blocks; and reading-out the data in the memory buffer to the intended recipient application program.

In a third aspect, the invention broadly consists in a method of receiving data on a user electronic device from a data source or sources over a communication link or data network, the data being provided to an intended recipient application program operating on the user electronic device, the method executed by a processor of the user electronic device, and comprising: receiving incoming data from the data source or sources over the communication link or data network; dynamically allocating the incoming data to one or more memory blocks within a memory buffer in memory of the user device based at least partly on the current usage status of the memory blocks; and providing the data from the memory buffer to the intended recipient application program on the user electronic device.

In a fourth aspect, the invention broadly consists in a method of receiving a streamed data file on an electronic device over a data network, the data file being segmented into data segments, the method executed by a processor of the electronic device, and comprising: receiving the incoming data segments; allocating multiple memory blocks in memory to receive the incoming data segments; maintaining a status value for each memory block that indicates its current usage status; allocating the incoming data segments to specific memory blocks based at least partly on the status value of the memory blocks; and re-assembling the data file in memory and delivering the data file or a portion of the data file to an application program on the electronic device requesting the data file.

In a fifth aspect, the invention broadly consists in a method of receiving a streamed data file on an electronic device, the method executed by a processor of the electronic device and comprising receiving the incoming data representing the data file into memory of the electronic device and providing the data in memory directly to an application program on the electronic device for use without storing the incoming data into any I/O storage component on the electronic device.

In a sixth aspect, the invention broadly consists in an electronic device for receiving data from a data source or sources over a communication link or data network, the data being provided to an intended recipient application program operating on the user device, the electronic device comprising: a processor; memory; and a local server that is configured to execute the method of any one of the methods of the preceding aspects of the invention.

In an seventh aspect, the invention broadly consists in a computer-readable medium having stored thereon computer executable instructions that, when executed on a processing device or devices, cause the processing device or devices to perform a method according to any one of the preceding aspects of the invention.

Each of the aspects of the invention above may have any one or more of the features mentioned in respect of any of the other aspects of the invention above.

Definitions or Terms or Phrases

The term "memory" as used in this specification and claims is intended to mean, unless the context suggests otherwise, quick or high speed access memory such as Random Access Memory (RAM), Static-RAM (SRAM) or Dynamic-RAM (DRAM), or any other volatile memory or high speed memory access, whether onboard a processor or otherwise provided on the electronic device, in contrast to I/O storage components or devices such as Hard Drive Disks, Solid State Drives, Flash Drives or the like.

The term 'comprising' as used in this specification and claims means "consisting at least in part of". When interpreting each statement in this specification and claims that includes the term 'comprising', features other than that or those prefaced by the term may also be present. Related terms such as 'comprise' and 'comprises' are to be interpreted in the same manner.

The phrase 'computer-readable medium' should be taken to include a single medium or multiple media. Examples of multiple media include a centralised or distributed database and/or associated caches. These multiple media store the one or more sets of computer executable instructions. The phrase 'computer readable medium' should also be taken to include any medium that is capable of storing, encoding or carrying a set of instructions for execution by a processor of a computing device and that cause the processor to perform any one or more of the methods described herein. The computer-readable medium is also capable of storing, encoding or carrying data structures used by or associated with these sets of instructions. The phrase 'computer-readable medium' includes solid-state memories, optical media and magnetic media.

Number Ranges

It is intended that reference to a range of numbers disclosed herein (for example, 1 to 10) also incorporates reference to all rational numbers within that range (for example, 1, 1.1, 2, 3, 3.9, 4, 5, 6, 6.5, 7, 8, 9 and 10) and also any range of rational numbers within that range (for example, 2 to 8, 1.5 to 5.5 and 3.1 to 4.7) and, therefore, all sub-ranges of all ranges expressly disclosed herein are hereby expressly disclosed. These are only examples of what is specifically intended and all possible combinations of numerical values between the lowest value and the highest value enumerated are to be considered to be expressly stated in this application in a similar manner.

As used herein the term "and/or" means "and" or "or", or both.

As used herein "(s)" following a noun means the plural and/or singular forms of the noun.

The invention consists in the foregoing and also envisages constructions of which the following gives examples only.

BRIEF DESCRIPTION OF THE DRAWINGS

Preferred embodiments of the invention will be described by way of example only and with reference to the drawings, in which.

DETAILED DESCRIPTION

In the following description, specific details are given to provide a thorough understanding of the embodiments. However, it will be understood by one of ordinary skill in the art that the embodiments may be practiced without these specific details. For example, software modules, functions, circuits, etc., may be shown in block diagrams in order not to obscure the embodiments in unnecessary detail. In other instances, well-known modules, structures and techniques may not be shown in detail in order not to obscure the embodiments.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be rearranged. A process is terminated when its operations are completed. A process may correspond to a method, a function, a procedure, a subroutine, a subprogram, etc., in a computer program. When a process corresponds to a function, its termination corresponds to a return of the function to the calling function or a main function.

Aspects of the systems and methods described below may be operable on any type of general purpose computer system or computing device, including, but not limited to, a desktop, laptop, notebook, tablet, smart television, or mobile device. The term "mobile device" includes, but is not limited to, a wireless device, a mobile phone, a smart phone, a mobile communication device, a user communication device, personal digital assistant, mobile hand-held computer, a laptop computer, wearable electronic devices such as smart watches and head-mounted devices, an electronic book reader and reading devices capable of reading electronic contents and/or other types of mobile devices typically carried by individuals and/or having some form of communication capabilities (e.g., wireless, infrared, short-range radio, cellular etc.).

1. Overview of System Configuration and Method Process

Figure 1:
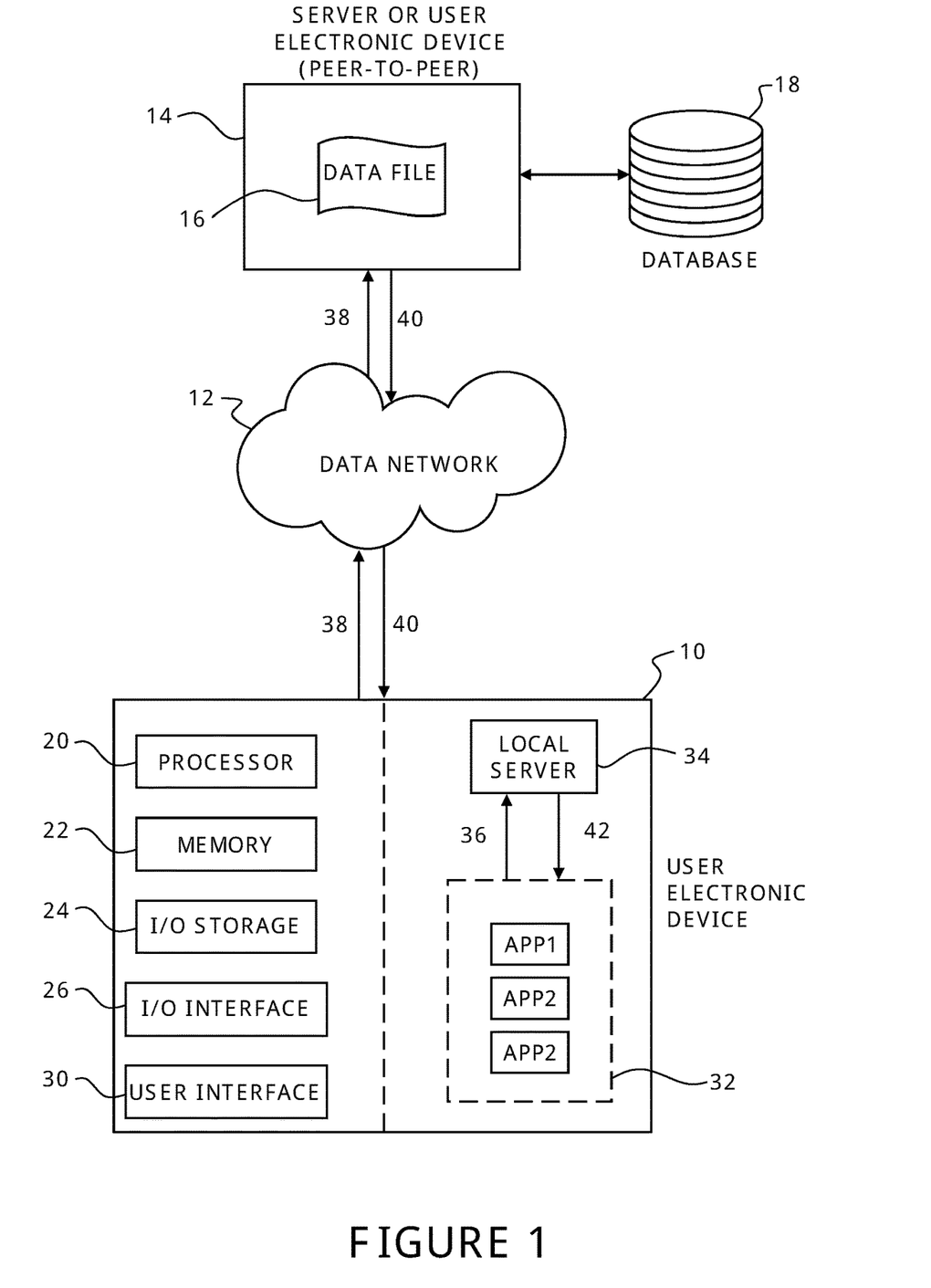
FIG. 1 is a schematic diagram of an overview of an example system configuration of in accordance with an embodiment of the invention.

Referring to FIG. 1, the invention relates to a system and method for receiving a data file 16 on a user electronic device 10 over a data network 12 from a data source, such as a remote device or system 14 including, but not limited to, a server or another user electronic device in a peer-to-peer file sharing context, or a combination of servers and/or peer-to-peer file sharing devices.

The remote device or system 14 may be any form of programmable electronic device or network of devices that is or are capable of transmitting or sending a data file 16 over a data network or networks 12 to an electronic user device 10 either in response to a data file request or where it is configured to actively push a data file to a user electronic device. In one example, the remote device 14 may be a data server and may comprise or be in data communication with a database 18 comprising a database of data files from which the user of the user electronic device may select for downloading or streaming.

The data network 12 may typically be the internet for example, but may also be another other data or communication network or combination of networks that form a data communication link, including intranets, extranets, cellular data networks such as 3G and 4G, direct wireless connections such as WiFi, Bluetooth, infrared, Near-field communication (NFC), or any other single or combination of wired and/or wireless data communication links or networks.

The user electronic device 10 may be any form of programmable electronic device such as, but not limited to, a computer, tablet, smart phone, smart television, or the like. The user electronic device 10 typically comprises hardware components such as, but not limited to, a processor 20, memory 22, input/output (I/O) storage component 24, I/O interface 26, and user interface 30. By way of example, the processor 20 may be any form of a CPU, microprocessor, microcontroller, Field Programmable Gate Array (FPGA), Application Specific Integrated Circuit (ASIC) or the like. The memory 22 typically comprises Random Access Memory (RAM) and/or memory onboard the processor. The I/O storage component 24 may, for example, comprise any one or more of a Hard Disk Drive (HDD), Solid State Drive (SSD), or Flash drive. The I/O interface 26 typically comprises any one or more components for enabling the device to connect or communicate with other devices or data networks, such as a communications module or module, wireless connection modules for cellular data connections such as 3G or 4G, WiFi, Bluetooth, NFC or the like, wired ports or connectors such as USB ports, Ethernet ports, parallel and serial ports. The user interface 30 may vary depending on the user electronic device 10, but comprises devices or components that enable the user to interact, operate or control the user device, and may typically comprise any one or more of a display or touch-screen display, keyboard, mouse, touch pad or ball, audio output and input such as speakers and microphone.

The user electronic device may comprise any one or more application or software application programs 32 (e.g. App1, App2, App3 etc) that the processor 20 executes. Any one or more of these application programs 32 may be configured to receive data files over a data network 12 from a remote device 14 either in response to a request initiated by the application program, for example in response to user interaction with the application program, or may simply receive data files pushed to the user electronic device 10 by the remote device 14. By way of example, the application programs may be in the form of web browsers, video or audio application programs, audio or video over IP (internet protocol) programs, or any other application program that downloads or streams data files, which are typically large such as audio and/or video data files, image files, or any other data files. The data files are typically sent or transmitted to the user electronic device in data segments, such as data packets, which are then re-assembled on the user electronic device for access, such as playback. For some applications, the entire data file may be downloaded prior to playback, and in other applications, the data file may be downloaded for streamed playback in which playback may commence after receiving at least a portion of the data file concurrently with receiving the remaining portions of the data file over the streaming download or playback session. In one embodiment, the data packets each have an associated ordinal or position value indicating their original position within the data stream of data segments representing the original data file.

The user electronic device 10 is provided with a local server 34 that is configured to control the reception of the data packets of the data file, temporarily store them in memory 22, and then deliver the data packets from memory to the application program without using or accessing the I/O storage 24 of the user electronic device 10. The local server 34 may be provided in various forms such as, but not limited to, an application program or virtual machine. In alternative embodiments, the local server may be provided in firmware or may be a dedicated hardware component.

The local server 34 is configured to allocate and manage at least one memory buffer in memory 22 comprising one or more memory blocks. The memory blocks may be sequential or offset from each other. Each memory block may further be segmented or divided into multiple memory segments, which are typically uniform in size, although this is not essential. By way of example, the memory blocks may be segmented using memory addresses or byte offset values, or any other segmenting technique. The local server 34 may determine the memory segment size within the memory blocks based on the size of the data packets or data segments of the data file received. The local server 34 is configured to allocate and manage the memory buffer. The memory buffer may be fixed or variable in size, and may contain one or more memory blocks that are fixed or variable in size.

In this embodiment, the memory buffer is defined by allocating or reserving one or more portions of device memory as the memory buffer. In this embodiment, the memory buffer is a contiguous portion or chunk of device memory. For example, the memory blocks of the memory buffer may be contiguous with respect to each other in memory. In alternative embodiments, the memory buffer may be non-contiguous portions of device memory.

In some embodiments, the local server 34 is configured to maintain a memory buffer that is fixed in size for the entire download session associated with a data file. In such embodiments, the local server is configured to determine or fix the size of the memory buffer prior to commencing the download session of a data file. The local server may determine the size of the fixed memory buffer based at least partly on the size of the data segments and/or data file being downloaded. In other embodiments, the local server 34 is configured to allocate the size of the memory buffer dynamically in real-time based on the current device memory usage. For example, the memory buffer size may be increased when more memory is available or reduced when memory is scarce, for example due to multiple application programs running or application program executing that use a heavy amount of memory.

In this embodiment, the local server is configured to intercept data requests 36 from one or more selected application programs or alternatively all application programs 32, and then forward the data file requests 38 to the remote device 14 over the data network 12. In alternative embodiments, the local server 34 need not necessarily intercept the outgoing data file requests, but may simply intercept or receive the requested data from the remote server before it reaches the intended recipient application program.

In one embodiment, the remote device is agnostic to the local server 34 on the user device 10 and/or the application programs 32 on the user device are also agnostic to the local server 34. This means that the remote device 14 sending or transmitting the data file does not need to be re-configured, and also the application programs 32 do not need to be re-configured. The local server 34 operates as an intermediate component between the remote device 14 and application programs 32 on the user device by intercepting data file requests from the application programs 32 and the data packets or segments sent or transmitted in response from the remote device 14. For example, in such embodiments, the local server is configured to implement the interception of the data file requests and/or data segments such that the recipient application programs 32 are agnostic to the interception. In such embodiments, the local server may be configured to operate on the electronic device in a manner that does not require modification of the code or operation of the application programs 32, although this is not essential in all embodiments.

The local server 34 is configured to receive or intercept the data packets or segments transmitted or streamed over one or more data streams or threads 40 back from the remote device 14 to the requesting application program of the user device 10. It will be appreciated that the application programs may stream or download data files using a single data stream or thread, or alternatively may use a plurality or multiple data streams or threads. As such, the local server 34 is also configured to handle a single data stream or thread, or a plurality or multiple data streams or threads. Additionally, application programs may be configured to request data files from more than one data source or remote device, and the local server 34 is configured to handle data received from one or more different data sources.

In some embodiments, when the data file is streamed or downloaded over a plurality of streams or threads, the local server may maintain a single memory buffer for the incoming data segments from all the threads. In other embodiments, the local server is configured to maintain a plurality of memory buffers, one memory buffer for each respective download thread.

As previously discussed, typically application programs 32 on the user device 10 initiate the transmission of data files from a remote device 14 by requesting such data files either automatically or in response to user operation of the application program. However, in some situations, remote devices 14 may push data files to application programs on user devices 10 without the user device sending a request or otherwise initiating the data file transmission. In either instance, the local server 34 on the user device is configured to intercept or receive the incoming data packets of the data file, and manages their storage in memory and re-assembly before passing the data to the intended recipient application program.

Upon receipt of incoming data, the local server monitors the status of the memory buffer and decides where in the memory buffer to store or allocate each received data packet. The local server 34 is configured to generate or provide a real-time status indicator such as a state value to each memory block in the memory buffer that is indicative of its current usage status. This state values are monitored to determine which memory blocks to allocate to incoming data packets. By way of example, the state value for each memory block of the memory buffer may be selected from a plurality of different state values. The state value may be updated by the local server as the status of the memory block changes. In this embodiment, the state values comprise the following:

State value 1=memory block empty, ready for data,
State value 2=memory block currently receiving data or partially full,
State value 3=memory block full, waiting to be read, and
State value 4=memory block read, ready to be cleared.

The above state values are in the form of index value from an index table in which each index value represents or corresponds to a different memory block usage state. It will be appreciated that alternative status indication values may be used in different embodiments. The status values may be numeric, non-numeric or a combination, such as an alpha-numerical value. There may be more or less statuses, or different statuses, depending on requirements. In one alternative embodiment for example, the system may be configured to operate based on two state or status values, such as a first state value that is indicative of the memory block being available for data (e.g. it is empty or only partially full), and a second state value that is indicative of the memory block being full and waiting to be read.

As will be explained in further detail later, the local server monitors the state values of the memory blocks of the memory buffer, and allocates the incoming data packets to the memory blocks based at least partly on their respective state values. In one configuration, as data packets arrive the local server may be configured to check the state value of each memory block in a predetermined or cyclical manner such that the memory blocks are filled in predetermined order, although this is not essential. In another configuration, the local server may allocate the data packets to specific memory blocks based on the state value and any one or more of a range of factors relating to the memory blocks such as, but not limited to, the size of the memory block, the number and size of memory segments in the memory block, and/or the position of the memory block in the memory buffer.

An example configuration will be briefly explained. In one configuration, as data packets first arrive in response to a data file request, all memory blocks will have state value 1 in that they are empty and ready for receiving data. The local server is configured to allocate the first incoming data packets to the memory segments of the first memory block in the memory buffer. For example, the data packets are stored in order of arrival into sequential order into the memory segments of the memory block. Once the first data packet is stored in the first memory segment of the memory block, the local server updates that corresponding state value of that memory block to 2, and continues to allocate data packets to the memory segments in that memory block until it is full, in which case its state is updated to state value 3. As further new data packets arrive, the local server then moves to the next memory block in the memory buffer having state value 1, and begins allocating those new data packets to respective memory segments of that memory block, while updating its state value to 2, and continuing to allocate data packets to the memory block until it is full. This process continues as the data packets arrive to cycle through the memory buffer.

In this embodiment, the local server 34 is configured to control the order the data packets are stored into the memory blocks to allow for re-assembly or read-out in the correct order. It is possible that data packets may arrive in a different order if sent over a plurality or multiple data streams or threads. The local server 34 is configured to identify the original or intended position or ordinal value of each data packet. In one configuration, the local server 34 is configured to store the data packets in sequential order to thereby fill up the memory segments of the memory blocks one by one in the correct order, such that sequential read-out of the memory segments of the memory blocks provides the re-assembled data file or a portion of the data file for accessing the application program. In an alternative configuration, the local server 34 is configured to allocate the data packets to sequentially fill up the memory segments of each memory block based on the order they arrive, but records or stores ordinal value associated with each received data packet against the location or address of the memory segment into which it is stored, for example in an index file. This enables the data packets to later be read-out in the correct order from their respective memory segment in the memory blocks.

In addition to managing the cyclic allocation of memory blocks in the memory buffer to receive the incoming data packets, the local server 34 is also configured to deliver, provide or otherwise read-out the data packets to the requesting application program 32 as shown at 42. In this embodiment, the local server 34 is configured to read-out the data packets from full memory blocks having a state value 3. The order of read-out is controlled by the local server 34 such that the data packets are re-assembled or read-out in the correct order. In one configuration, the data packets are stored in the correct order sequentially in each memory block, and the application program is provided data from the memory segments in sequential order from the memory blocks in order from first-full to last-full to provide the correctly re-assembled original data file. In another configuration, the local server references the index file to determine the memory segment location of the ordered data packets and retrieves the data packets in the correct order from the respective memory segments of the memory blocks to re-assemble and deliver the original data file on the fly to the application program 32. Upon emptying a memory block during the read-out process, the state value of the memory block is updated to state value 4, which indicates the memory block has been read, and is ready to be cleared or emptied. The local server 34 is then configured to clear or empty the memory blocks having state value 4, and then updates their state value to 1, such that the memory blocks can be re-allocated or re-used for further incoming data packets of the data stream or streams. The local server is therefore configured to cyclically or dynamically re-allocate memory in the memory buffer as data packets arrive.

In configurations in which the local server designates a fixed size memory buffer prior to a download or streaming session, the local server is also configured to selectively stall the receipt or download of further incoming data segments if the status indicator(s) of the memory buffer indicate there is no further available space in the memory buffer for storing the further incoming data segments. The local server then continually or periodically monitors the status of the memory buffer and can re-initiate or re-commence the receipt or download of further incoming data segments if the status indicator(s) of the memory buffer indicate there is available memory space in the memory buffer for storing further incoming data segments. As discussed above, memory space in the memory buffer is typically freed up once data segments in a memory block have been read out to the application program, which enables the memory block to be cleared or overwritten with new incoming data segments.

It will be appreciated that some application programs will be configured to receive or read-out the entire data file before enabling access by the user, e.g. for playback in the context of an audio or video data file. Other application programs may be configured for streaming partial audio or video data files and may enable access, e.g. playback of the received portion of the data file regardless of whether the entire data file has yet been received, i.e. playback of the received portion of the data file may be commenced on the application program while concurrently receiving the remaining portions of the data file.

2. Example—Video or Audio Player Receiving a Video or Audio Data Stream

By way of example only, an embodiment of the system and method will be described in the context of an audio or video player application program on a user device streaming audio or video data from a data source such as a remote server or peer-to-peer network with reference to FIGS. 2 and 3. In this context, the system and method provides enhanced delivery of the streaming audio or video content.

Figure 2:
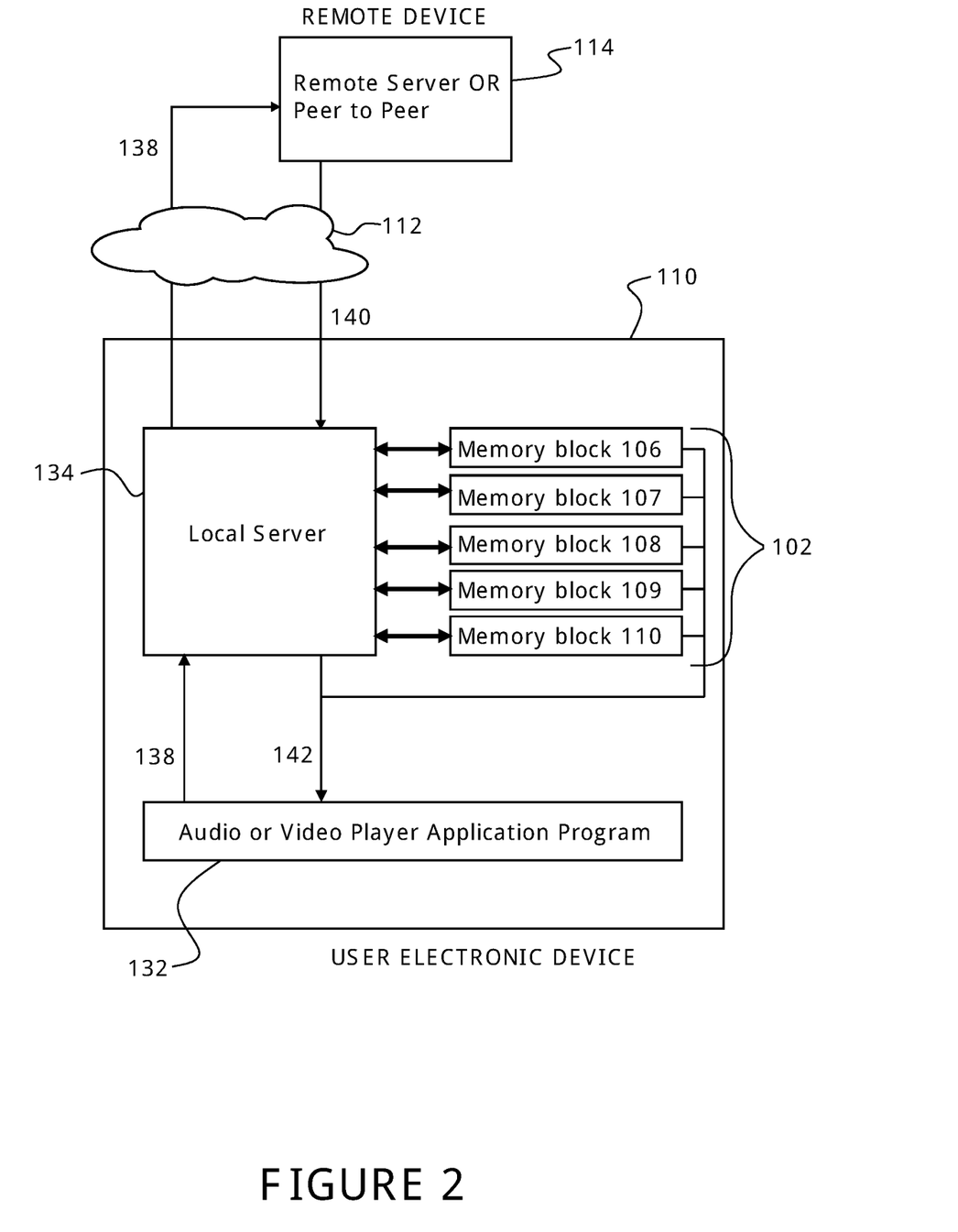
FIG. 2 is a schematic diagram showing an example implementation of the system in relation to a video player application requesting a streamed video data file in accordance with an embodiment of the invention.

Referring to FIG. 2, the streaming audio or video player software application 132 executing on the user electronic device 110 is operated by a user to select or request an audio file or video file to stream over a data communication link, such as a data network 112 or networks, from a remote data source 114 such as a remote server or remote device in a peer-to-peer network.

The data file request 138 from the audio or video player 132 on the user device 110 is intercepted and managed by the local server 134, such as a software application or virtual machine. In this embodiment, the local server 134 is configured to forward or relay the data requests to the remote device 114 over the data network at shown at 138, and the local server is configured to receive the data returned from the remote device 114 as shown at 140. It will be appreciated that the local server 134 may be configured to request data using single threads or a plurality or multiple threads or multiple threads operating concurrently, and may be configured to receive the requested returned data from the remote device 114 at the user device 110 using single or multiple threads.

As previously discussed, the local server 134 obtains one or more chunks or portions of the available memory, such as RAM, on the user electronic device and designates this as a memory buffer 110 for the local server. The memory buffer may comprise one or more distinct memory blocks 106-110. Each memory block 106-110 may either correspond to a respective chunk or portion of the obtained memory, or alternatively the chunk or chunks of memory may be segmented into one or more assigned distinct memory blocks 106-110. The memory blocks may be uniform or different in size. Additionally, the memory blocks may be fixed or variable in size depending on the available memory on the user device. As such, the total memory buffer 102 may be fixed or variable in size, and the local server may be configured to dynamically release unneeded memory or obtain more memory based on the available memory resource and the resource required to handle the incoming data for any particular application program or programs. In this embodiment, the memory buffer is a contiguous portion of the device memory, such that the memory blocks are contiguous. The size of the allocated memory buffer may in some applications be as little as 64 KB or alternatively in excess of 200 MB. In one particular example, the memory buffer is 40 MB, although it will be appreciated that size may be altered as required. In one configuration, the size of the memory buffer is set prior to each new download session of a data file, and maintained or fixed during that download session. In other configurations, the size of the memory buffer may be dynamically altered during the download session, as previously described.

In this embodiment, each memory block is segmented or divided into a plurality of memory segments. The size of the memory segments within each memory block is typically uniform, although this is not essential. In this embodiment, the local server may be configured to designate the memory segment size to match the size of the individual incoming data packets being received.

As will be further explained with reference to FIG. 3 below, the local server receives the incoming requested data and allocates it to specific memory blocks 106-110 within the memory buffer 102 on a cyclical manner based at least partly on the usage status of each memory block. The data is then sent or read-out or otherwise accessed from the memory buffer 102 to the audio or video player 132 to enable the audio or video player to begin playback of the streamed audio or video content.

Figure 3:
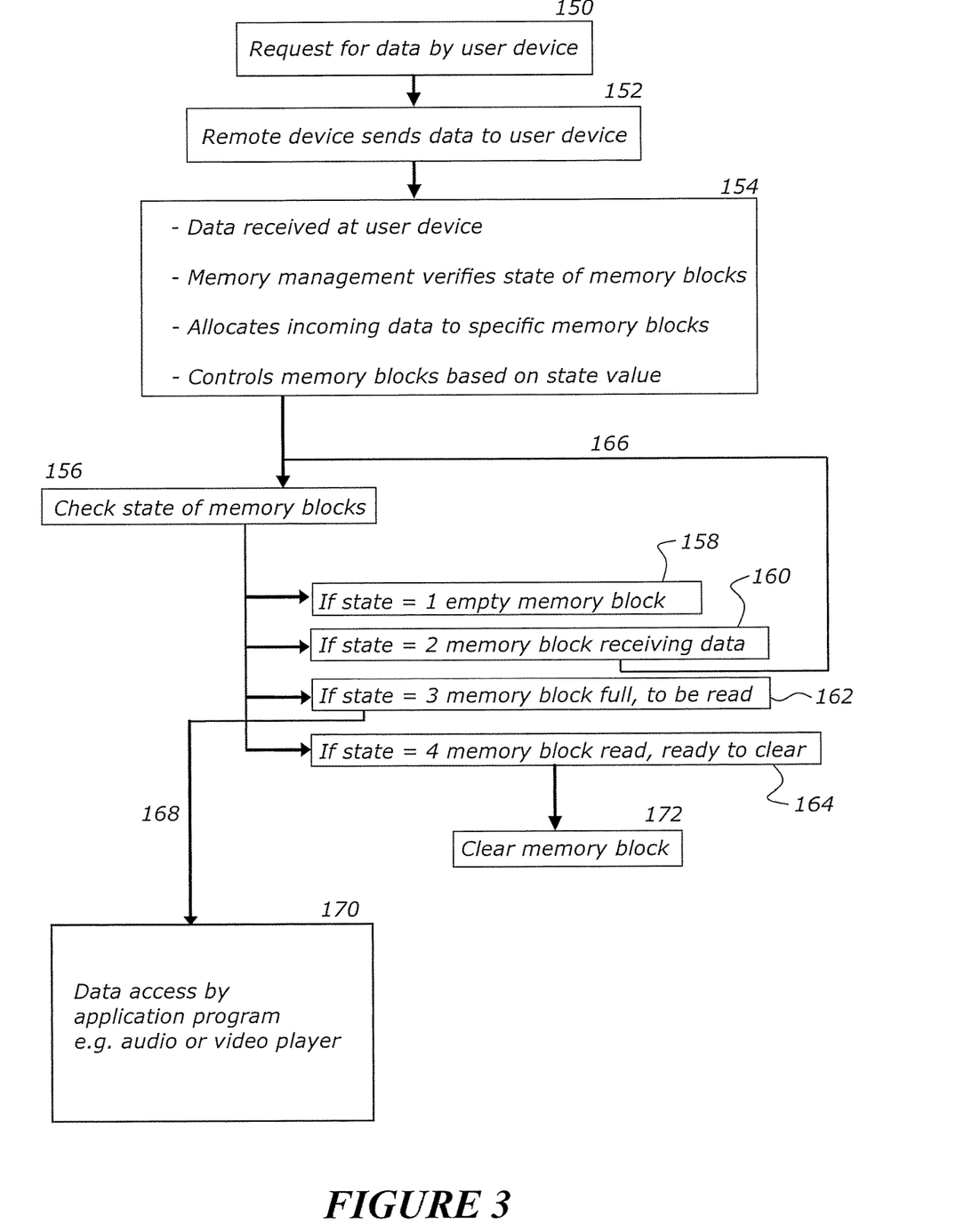
FIG. 3 is a flow diagram showing an example of the main process steps for receiving the streamed video data file in the system of FIG. 2 in accordance with an embodiment of the invention.

Referring to FIG. 3, an example of the memory allocation and access control carried out by the local server 134 will be described. As previously discussed, the process starts by a request for data being sent from the user electronic device 110 to the remote device 114 as shown at 150. The remote device 114 then responds by sending the requested data or data file, typically in data segments such as data packets or similar as shown at 152.

Upon receiving the incoming data as shown at 154, the local server 134 is configured to carry out various operations or functions to monitor and manage the memory blocks and allocate their usage for the incoming data. For example, the local server 134 is configured to monitor or verify the status of the memory blocks 106-110 with the memory buffer 102 and allocates the incoming data to a specific memory block based at least partly on the status of the memory blocks in this embodiment.

A status indicator, such as a state value, is maintained for each respective memory block. The status indicator is indicative of the usage of the memory block as previously described. In this embodiment, by way of example, there are four states, as previously described. At step 156, the local server periodically or continuously monitors or verifies the state value of each memory block 106-110 of the memory buffer 102. If the memory block is in state 1 as indicated at 158, then it is empty and the incoming data may be placed into that memory block, typically sequentially filling up the memory segments of the memory block in order from first to last, although this is not essential. If a memory block is in state 2 as indicated at 160, data is currently being placed into that memory block or it is partially full, and incoming data is typically directed or allocated 166 to memory blocks in state 2, in preference of those in state 1, until the partially full memory blocks are filled up. If there are no memory blocks in state 1 or 2 capable of receiving data, the local server waits for the next available memory block to revert to state 1, and allocates that memory block to the new incoming data.

If the memory block is in state 3 as indicated at 162, the memory block is full and waiting to be read. The local server may initiate access or read-out 168 of such memory blocks to the application program as indicated at 170. In some situations, the local server may also initiate access or read-out by the application program of partially full memory blocks in state 2.

If the memory block is in state 4 as indicated at 164, this indicates the memory block has been read, and can now be cleared or overwritten. The local server 134 is configured to execute a clear operation 172 on such memory blocks to clear the data in the memory blocks, thereby reverting the memory blocks back to state 1, which indicates they are empty and ready for data. It will be appreciated that in some configurations the read memory blocks need not necessarily be cleared or purged of old data read-out to revert to be considered 'empty' for state 1, but may simply be designated as being in state 1 after being read-out such that the old read-out data may be overwritten with new incoming data without actively clearing the old read-out data.

In this embodiment, the local server monitors the status of the memory blocks and updates their respective state values, which may be stored in memory or elsewhere. For example, if the local server allocates new incoming data to a state 1 memory block, its state value is updated to state 2. If a memory block becomes full, is state value is changed from state 2 to state 3. If a memory block has been read-out or its data has been accessed by the application program 132, its state value is changed from state 3 to state 4.

As previously discussed, the allocation of the incoming data into the memory blocks may be carried out in various ways to allow the correct re-assembly of the received data in the correct order by the application program 132.

With the above process, at no stage is any of the incoming audio or video data written to an I/O storage device or component on the user electronic device prior to being received by the application program for playback. The incoming data is all allocated into a memory buffer in memory on the user electronic device that is maintained by a local server, and then delivered directly to the requesting application program for use, e.g. playback and/or display in the context of audio or visual data streams or files.

3. Summary of Features of Some Embodiments

Some features of the embodiments above are summarised in the following.

The system and method disclosed provides a method of receiving a data file transmitted over a data network. The method and system comprises the steps of re-allocation of memory on a user electronic device in a cyclic manner to receive and store the incoming data from a single or multiple threads, and then manages access or read-out of the data from memory to the intended recipient application program. It will be appreciated that the data may be transferred across the network from the remote device to the user electronic device using any standard data network protocols in a client server or peer to peer structure, whether there are single or multiple data sources.

The system and method retains all incoming data segments or data packets of data received by a client device in a memory cache, without accessing an I/O storage device or component on the user device. The method comprises the allocation of a fixed or variable memory buffer comprising one or more fixed or variable memory blocks. These memory blocks are managed by a local server application or virtual machine to manage the allocation of incoming data to the next available memory block, and enable read-out or access to the data in memory blocks by the intended recipient application program. The local server is also configured to clear memory blocks from which data has already been read. An application program accessing the data in the memory buffer controlled by the local server is provided with the data from memory, without the data being written to the I/O storage device, which tends to reduce CPU or processor usage comparative to conventional download protocols.

4. General

Furthermore, embodiments may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

In the foregoing, a storage medium may represent one or more devices for storing data, including read-only memory (ROM), random access memory (RAM), magnetic disk storage mediums, optical storage mediums, flash memory devices and/or other machine readable mediums for storing information. The terms "machine readable medium" and "computer readable medium" include, but are not limited to portable or fixed storage devices, optical storage devices, and/or various other mediums capable of storing, containing or carrying instruction(s) and/or data.

The various illustrative logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, circuit, and/or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

One or more of the components and functions illustrated the figures may be rearranged and/or combined into a single component or embodied in several components without departing from the invention. Additional elements or components may also be added without departing from the invention. Additionally, the features described herein may be implemented in software, hardware, as a business method, and/or combination thereof.

In its various aspects, the invention can be embodied in a computer-implemented process, a machine (such as an electronic device, or a general purpose computer or other device that provides a platform on which computer programs can be executed), processes performed by these machines, or an article of manufacture. Such articles can include a computer program product or digital information product in which a computer readable storage medium containing computer program instructions or computer readable data stored thereon, and processes and machines that create and use these articles of manufacture.

The foregoing description of the invention includes preferred forms thereof. Modifications may be made thereto without departing from the scope of the invention as defined by the accompanying claims.

The invention claimed is:

1. A method of receiving data segments of a data file on a user electronic device from a remote data source or sources over a data network, the data file being requested by or being pushed to an intended recipient application program executing on the user electronic device, the method executed by a local server operating on the user electronic device and wherein the local server is an intermediate component between the remote data source(s) and the recipient application program, the user electronic device comprising memory and one or more I/O storage components, and the method comprising:
- receiving incoming data segments from the remote data source over the data network;
- maintaining a memory buffer in memory of the user electronic device comprising one or more memory blocks;
- maintaining a status indicator for each memory block in the memory buffer that is indicative of the status of the memory block;
- allocating incoming data segments to specific memory blocks for storage in the memory buffer based at least partly on their respective status indicator; and
- providing the stored data segments from the memory buffer to the recipient application program on the user electronic device, without the data segments being written or stored in any of the I/O storage components of the user electronic device.

2. A method according to claim 1 wherein receiving incoming data segments comprises receiving the data segments over a plurality or multiple threads that execute or operate concurrently and wherein the method further comprises maintaining a plurality of memory buffers, one for each respective thread of incoming data segments.

3. A method according to claim 1 wherein the data segments are segmented from the original data file, each data segment having an associated position or ordinal value representing its position within the original data file relative to the other data segments.

4. A method according to claim 1 wherein the data segments are in the form of data packets, and wherein receiving incoming data segments comprises receiving one or more data streams over a data network that is the internet, and wherein the remote data source is a streaming data source, and wherein the local server is a software application program or a virtual machine.

5. A method according to claim 1 wherein the remote data source(s) is a data or network server or combination of data or network servers, a remote device or combination of remote devices operating in a peer-to-peer network or structure, or a combination of data or network servers and remote devices in a peer-to-peer network or structure.

6. A method according to claim 1 wherein maintaining the memory buffer in memory comprises allocating or designating a contiguous portion of available memory of the user electronic device for the one or more memory blocks.

7. A method according to claim 1 wherein maintaining the memory buffer in memory comprises segmenting each memory block into a plurality of memory segments, and wherein segmenting each memory block into a plurality of memory segments comprises segmenting the memory blocks into memory segments having a size that matches the incoming data segments.

8. A method according to claim 1 wherein maintaining the memory buffer comprises maintaining a memory buffer that is fixed in size for the entire download session associated with a data file, and wherein the method further comprises determining the size of the fixed memory buffer prior to commencing the download session of a data file, and wherein the method further comprises determining the size of the fixed memory buffer based at least partly on the size of the data segments and/or data file being downloaded.

9. A method according to claim 1 wherein the method further comprises stalling the receipt of further incoming data segments if the status indicator(s) of the memory buffer indicate there is no further available memory space in the memory buffer for storing the further incoming data segments, and wherein the method further comprises re-initiating the receipt of further incoming data segments if the status indicator(s) of the memory buffer indicate there is available memory space in the memory buffer for storing further incoming data segments.

10. A method according to claim 1 wherein maintaining the memory buffer comprises maintaining a memory buffer that is variable in size, and wherein maintaining the memory buffer comprises dynamically increasing or reducing the size of the memory buffer based on the current memory resource available and/or the memory resource required.

11. A method according to claim 1 wherein the status indicator associated with each memory block is indicative of or represents the usage status of the memory block, or wherein maintaining a status indicator for each memory block in the memory buffer comprises maintaining a status indicator in the form of a state value selected from a predetermined number of different states, and wherein the state values each respectively correspond to one of the following states: memory block empty, memory block receiving data or currently full, memory block full, memory block read.

12. A method according to claim 1 wherein maintaining a status indicator for each memory block comprises updating the status indicator for each block periodically, continuously, or in response to a detected change in memory block status.

13. A method according to claim 1 further comprising intercepting data file requests generated by the recipient application program, and forwarding those data requests to the remote data source, and wherein receiving incoming data segments from the remote device over the data network comprises intercepting the data segments requested by the recipient application program, and wherein the method comprises implementing the interception of the data file requests and/or data segments such that the recipient application program is agnostic to the interception.

14. A method according to claim 1 wherein allocating incoming data segments to specific memory blocks in the memory buffer comprises allocating incoming data segments to a memory block or blocks having a status indicator indicative of the memory block being empty or partially full.

15. A method according to claim 1 wherein providing the data segments from the memory buffer to the recipient application program comprises reading-out to the application program, or enabling access by the application program to, the data segments in memory blocks having a status indicator indicative of the memory block being full, and further comprising clearing or emptying memory blocks having a status indicator indicative of the memory block having been read by the recipient application program so that the memory blocks of the memory buffer can be re-used for storing new incoming data segments.

16. A method according to claim 1 wherein the memory buffer comprises contiguous memory blocks and the method may comprise allocating incoming data segments to specific memory blocks of the memory buffer in a cyclical manner and based on their status indicator(s).

17. A method according to claim 1 wherein providing the data segments from the memory buffer to the recipient application program comprises re-assembling and/or providing the data segments from the memory buffer in the correct order to the recipient application program.

18. A method according to claim 1 wherein the data file is an audio or video data file streamed from the data source, and the recipient application program is an audio or video playback application program, and the method comprises reading-out to the application program, or enabling access by the application program to, the data segments in the memory buffer such that the application program can directly receive or access the data segments from the memory buffer for streamed playback for the audio or video data file.

19. A method of receiving data on a user electronic device from a data source or sources over a communication link or data network, the data being provided to an intended recipient application program operating on the user electronic device, the method executed by a local server operating on the user electronic device and wherein the local server is an intermediate component between the data source(s) and the recipient application program, the user electronic device comprising memory and one or more I/O storage components, and the method comprising:

receiving incoming data from the data source or sources over the communication link or data network;

dynamically allocating the incoming data to one or more memory blocks within a memory buffer in memory of the user device based at least partly on the current usage status of the memory blocks; and providing the data from the memory buffer to the intended recipient application program on the user electronic device, without the data segments being written or stored in any of the I/O storage components of the user electronic device.

20. A method of receiving a streamed data file on an electronic device over a data network, the data file being segmented into data segments, the method executed by a local server operating on the electronic device, the electronic device comprising memory and one or more I/O storage components, and the method comprising;

receiving the incoming data segments;

allocating multiple memory blocks in memory to receive the incoming data segments;

maintaining a status value for each memory block that indicates its current usage status;

allocating the incoming data segments to specific memory blocks based at least partly on the status value of the memory blocks; and re-assembling the data file in memory and delivering the data file or a portion of the data file to an application program on the electronic device requesting the data file, without the data segments being written or stored in any of the I/O storage components of the electronic device, and wherein the local server is an intermediate component separate to the application program.

* * * * *